United States Patent
Perraud

(10) Patent No.: US 8,873,457 B2
(45) Date of Patent: Oct. 28, 2014

(54) METHOD AND APPARATUS FOR ENHANCED DATA RATE ADAPTATION AND LOWER POWER CONTROL IN A WLAN SEMICONDUCTOR CHIP

(75) Inventor: Eric Perraud, Tournefeuille (FR)

(73) Assignee: Freescale Semiconductor, Inc., Austin, TX (US)

( * ) Notice: Subject to any disclaimer, the term of this patent is extended or adjusted under 35 U.S.C. 154(b) by 720 days.

(21) Appl. No.: 12/282,491

(22) PCT Filed: Mar. 15, 2006

(86) PCT No.: PCT/EP2006/004031
§ 371 (c)(1),
(2), (4) Date: Sep. 10, 2008

(87) PCT Pub. No.: WO2007/104341
PCT Pub. Date: Sep. 20, 2007

(65) Prior Publication Data
US 2009/0052426 A1    Feb. 26, 2009

(51) Int. Cl.
*H04B 7/185* (2006.01)
*H04W 52/26* (2009.01)
*H04W 52/20* (2009.01)
*H04W 52/14* (2009.01)
*H04W 52/22* (2009.01)
*H04W 84/12* (2009.01)
*H04W 52/02* (2009.01)

(52) U.S. Cl.
CPC ............ *H04W 52/267* (2013.01); *H04W 52/20* (2013.01); *H04W 52/146* (2013.01); *H04W 52/223* (2013.01); *H04W 84/12* (2013.01); *H04W 52/0232* (2013.01); *H04W 52/0245* (2013.01); *Y02B 60/50* (2013.01)
USPC ........ 370/318; 455/13.4; 455/522; 455/127.1

(58) Field of Classification Search
None
See application file for complete search history.

(56) References Cited

U.S. PATENT DOCUMENTS 6,584,501 B1 *  6/2003  Cartsonis et al. ............. 709/224
6,831,517 B1    12/2004 Hedberg et al.
7,298,784 B2    11/2007 Matsusaka
(Continued)

FOREIGN PATENT DOCUMENTS

JP  9-219649 A   8/1997
JP  11-074806 A  3/1999
(Continued)

OTHER PUBLICATIONS

Zhang et al., "Efficient Mobility Management for Vertical Handoff between WWAN and WLAN", IEEE Communications Magazine, Nov. 2003, p. 102-108.*
IEEE Standard 802.11e.

*Primary Examiner* — Khoa Huynh

(57) ABSTRACT

A method of optimising the operation of a WLAN device which is used in the transmission and reception of a service over a medium includes determining a the value of a collision avoidance metric of the chip set at a specific time; predicting the available bandwidth of the WLAN from the value of the metric; determining the current data rate of the WLAN based on predicted available bandwidth and the type of service; and selecting a power amplifier bias voltage that is the minimum permitted for the determined current data rate to reduce the power consumption of the WLAN device.

20 Claims, 3 Drawing Sheets

(56) References Cited

U.S. PATENT DOCUMENTS

| | | |
|---|---|---|
| 7,502,340 B1 * | 3/2009 | Chuang et al. ............ 370/318 |
| 2004/0170122 A1 * | 9/2004 | Guo et al. ............ 370/210 |
| 2004/0174808 A1 * | 9/2004 | Bolinth et al. ............ 370/206 |
| 2004/0266451 A1 * | 12/2004 | Stolyar et al. ............ 455/452.2 |
| 2005/0138451 A1 | 6/2005 | Simpson et al. |
| 2005/0143115 A1 * | 6/2005 | Hiddink et al. ............ 455/522 |
| 2005/0152321 A1 * | 7/2005 | Maufer et al. ............ 370/338 |
| 2006/0270433 A1 * | 11/2006 | Kelton et al. ............ 455/522 |

FOREIGN PATENT DOCUMENTS

| | | |
|---|---|---|
| JP | 2003-037640 A | 2/2003 |
| WO | 9909710 A | 2/1999 |
| WO | 0111815 A | 2/2001 |
| WO | 03043266 A | 5/2003 |
| WO | 2004098132 A1 | 11/2004 |
| WO | 2005062808 A2 | 7/2005 |

* cited by examiner

METHOD AND APPARATUS FOR ENHANCED DATA RATE ADAPTATION AND LOWER POWER CONTROL IN A WLAN SEMICONDUCTOR CHIP

FIELD OF THE INVENTION

The present invention relates to a method and apparatus enhanced data rate adaptation and lower transmitted power in an electronic device, preferably to minimise power consumption.

BACKGROUND OF THE INVENTION

There are many environments where a device that is battery powered is used. In these types of devices (and others) it is common that power management issues are taken into consideration. Such devices include many cellular applications such as for telephony or automotive applications.

In particular circumstance the devices may include wireless local area network (WLAN) chip sets to enable a user to receive services such as voice and video over internet protocol (V2IP).

Historically, WLAN chip sets have been designed predominately for the PC environment. In these circumstances the primary objective has been about data throughput and power consumption is not generally a big consideration. This had led chip manufactures to embed data rate control mechanisms into WLAN chips to optimise the data throughput for the user.

Another power consumption minimisation technique has been to reduce the number of transmitted WLAN packets for a duplex burst from 6 to 4, and then switch off the terminal between WLAN transmissions. This has been adopted by the IEEE 802.11e standard, but does not solve all the problems for V2IP or VoIP over WLAN.

Low power link adaptation has also been proposed by first adjusting data rate to maximise this and then adjusting transmitted power control both for a targeted packet error rate (PER). As data rate maximisation is the overriding objective, power control is often insufficient. This method is based on achieving the highest possible data rates and is not necessarily the most suitable for V2IP or any application which requires a reasonably low throughput.

Another approach teaches monitoring the medium occupancy to select the optimal data rate for specific power consumption. The data-rate is adapted for the WLAN traffic by estimating the WLAN traffic based on the average contention window, or the number of past collisions or the proportion of time the channel was busy during previous frame transmissions. But for V2IP or VoIP application, the transmission rate is low (~50 transmissions/s) and the transmission duration (relative to the transmission interval) is also low. Thus the traffic may have changed significantly between last transmissions and the next transmissions. This makes this method of estimating the WLAN traffic very unreliable and is thus not a reliable metrics.

If metrics used to estimate the available bandwidth include the contention window of past transmissions for a V2IP or VoIP applications, it is an estimate of the WLAN traffic of the previous 20 ms slots, not of the latest 20 ms slot (just before trying to get access to the channel) and so again is unreliable.

The main drawbacks of the identified prior art include:
1. The reduction in power consumption at different data rates to transmit the same quantity of information with the same radio frequency (RF) propagation conditions is not linear and thus the best data rates to not mean low power consumption.
2. As the nature of V2IP or VoIP transmission medium is typically a radio channel which changes very quickly, propagation conditions can change faster than transmission rate. This severely effects the estimation time for metrics in the link adaptation algorithm making it effectively useless as convergence may never occur.
3. The above mechanisms to estimate the WLAN traffic are well suited for a relatively high loaded WLAN network or when the device attempts to transmit a data packet often. But for applications of low throughput, it is not efficient (for the above explained reasons).

Finally WLAN power amplifier (PA) bias control has been proposed as a low power consumption solution for WLAN chip sets by Intersil. In this proposal PA bias is adapted to input RF power to maintain a required back-off for modulation types such as OFDM or CCK. The PA bias is kept the same and is not dynamically adjusted.

One object of the present invention is to overcome at least some of the problems of prior art methods and systems.

SUMMARY OF THE INVENTION

The present invention provides a method and apparatus as defined in the accompanying claims.

BRIEF DESCRIPTION OF THE DRAWINGS

Reference will now be made, by way of example, to the accompanying drawings in which.

DETAILED DESCRIPTION OF THE PREFERRED EMBODIMENTS

Voice and Video over internet protocol (V2IP) is used to provide voice and video to, for example, a cellular device such as a mobile phone or automobile communications device. The video and voice data are transmitted over a medium, such as a wireless medium to a user via a WLAN link.

Uplink (UL) throughput for V2IP is typically 500 kbps (kilobits per second). The typical packet transmission interval is between about 20 to 40 ms, which means that the average packet size is about 1500 bytes. Of the order of fifty (50) or less packets are typically transmitted per second for V2IP over WLAN.

Figure 1:
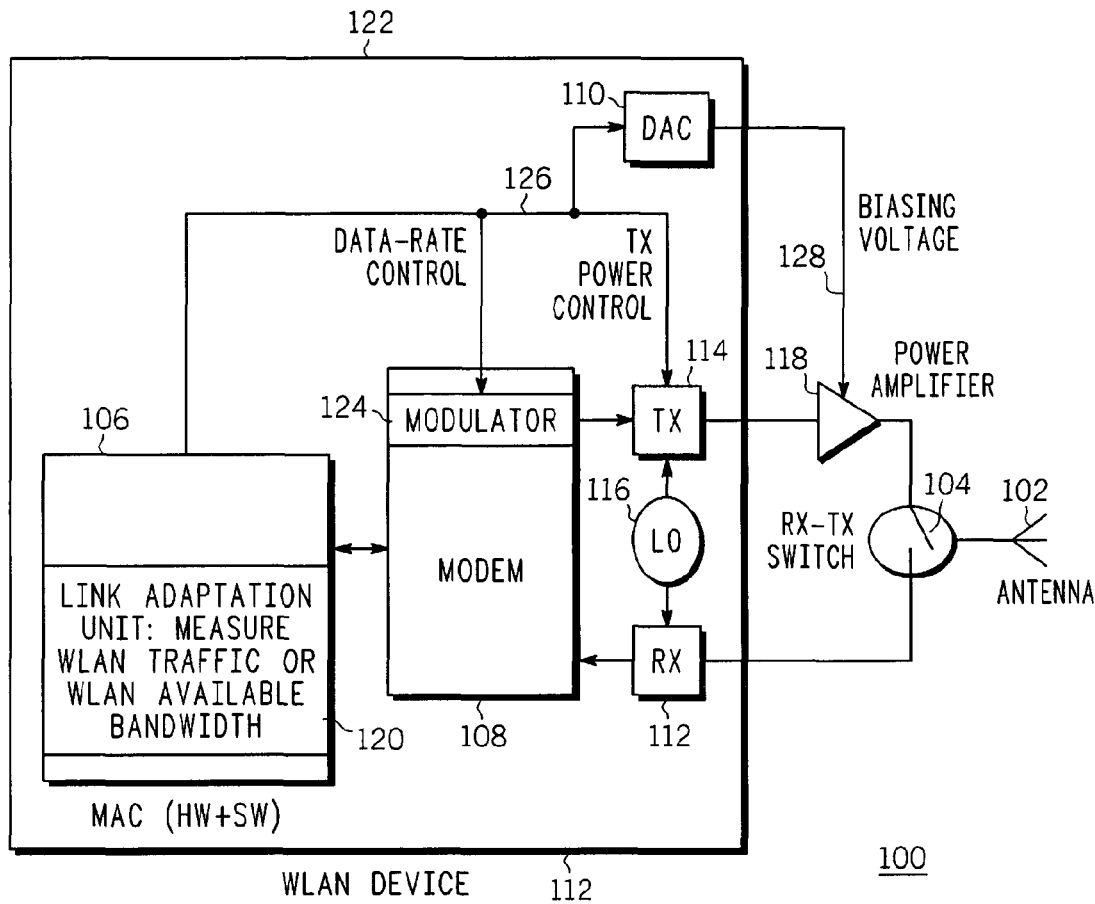
FIG. 1 is a circuit diagram of a WLAN in accordance with one embodiment of the invention, given by way of example.

FIG. 1 shows a circuit diagram of a WLAN 100 according to one embodiment of the present invention. The WLAN is connected to an antenna 102 via a receive transmit switch 104. The antenna receives and transmits V2IP signals between a user and a service provider over the medium. The WLAN and antenna can be at either end of the transmission or reception path of the data.

The WLAN includes the following main functional blocks, a medium access controller (MAC) 106, a modem 108, a transmitter 110, a receiver 112 a local oscillator 114, and a digital to analogue converter (DAC) 116. A power amplifier (PA) 118 is connected the WLAN transmitter and antenna.

The MAC is implemented in hardware, software or a combination thereof and includes a link adaptation unit 120. The link adaptation unit measures WLAN traffic and estimates UL available bandwidth as will be described in detail below. The determined bandwidth is then used to generate a data rate control input 122 for a modulator 124 located within the modem. A transmit power control signal 126 is generated which is transmitted to the transmitter 110, to control power consumption of the transmitter and another signal is passed to DAC 116 to produce a bias voltage 128 for the power amplifier 118. The detail of this will be described in greater detail below.

Ideally, the terminal of a mobile communication means (for example a telephone, computer, PDA etc) would monitor the transmission medium from the last packet transmission until the moment when a new V2IP or VoIP packet is to be transmitted, this would clearly not be a low-power implementation.

Figure 2A:
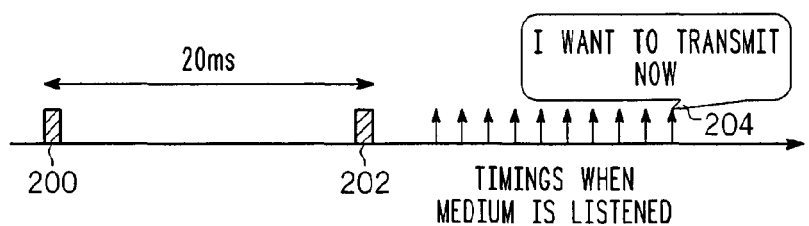
FIGS. 2a to 2c are time diagrams showing how the network allocation vector (NAV) is used in accordance with one embodiment of the invention, given by way of example.
Figure 2B:
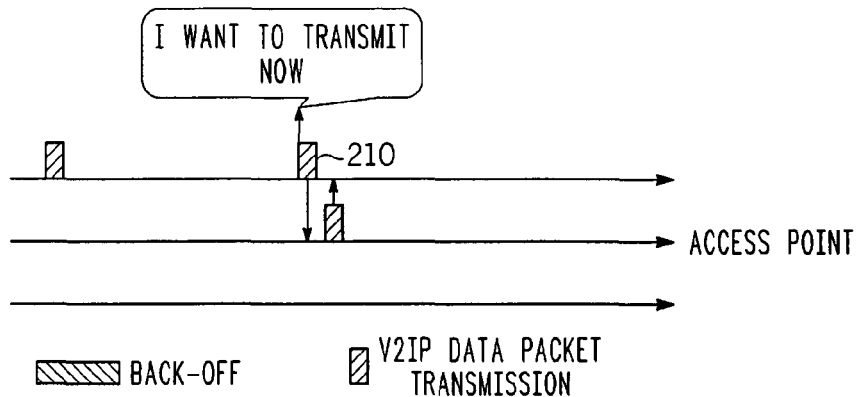
Figure 2C:
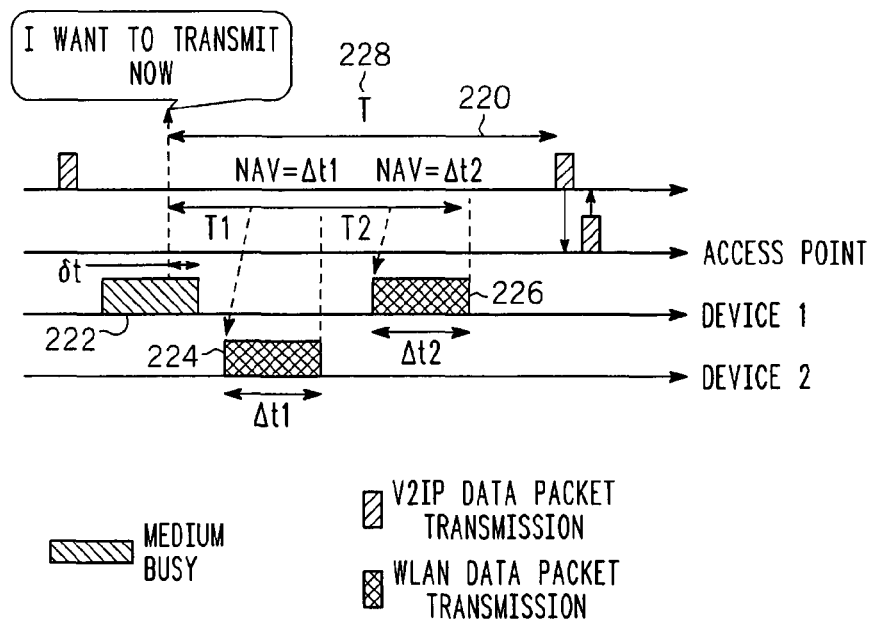

Referring now to FIGS. 2a-2c the means and method by which the monitoring can be done in a low-power implementation according to the present invention is described. One way to estimate the data rate on the medium may consist in sensing the RSSI (Received Signal Strength Indicator) level or CCA (Clear Channel Assessment) at regular intervals from the last data transmission. This is shown in FIG. 2a. The packets 200 and 202 are transmitted at 20 ms intervals. The medium is monitored at the position of each arrow and the last arrow 204 is the point at which the next transmission is intended.

For RSSI the available bandwidth can be determined as follow with reference to FIG. 2a:

Available bandwidth=1−(number of RSSI measurements>predetermined threshold)/number of RSSI measurements For CCA the available bandwidth is given by:
Or Available bandwidth=1−(number of measurements (CCA=false))/number of CCA measurements Accordingly an estimate of available bandwidth is determined to enable determination of the control signals for transmitter power and PA bias. The preferred metrics is the network allocation vector (NAV) following because it drains less power than at least some of the other methods. The metrics identified are used in the chip set to ensure avoidance of collisions (or the details of when the channel is clear, so that there will be no collisions) between two or more transmissions in the RF transmission network or the application or service which is being sent or received.

When the mobile communication means wants to transmit a V2IP packet, it reads the latest metrics (for example NAV, RSSI, CCA) and then selects the data-rate accordingly. The mobile then tries to gain access to the transmission medium in any appropriate way, for example as defined in the IEEE standard 802.11. Assuming that the medium is idle at the time, the device will transmit a V2IP packet 210 at the data-rate defined by the metrics, there will be no delay and the process is simple. Details of transmitting a packet from an idle start point as mentioned above are shown in FIG. 2b.

Referring now to FIG. 2c, in an alternative situation, assume that the medium is busy 220. Transmission will be deferred until a back-off counter 222 expires. This in turn means that the device must wait for the medium to become idle first before restarting its back-off counter. If during its contention window, a new frame is transmitted, the device will freeze the back-off counter and update its NAV to be NAV1=Δt1 (224). Δt1 with an Identification field (the ID) indicates the duration of the received frame. The device can sleep during this time, thereby saving power. The metric duration (Metric) is then updated as follows:

Metric=(δ*t*+NAV1)/*T*1; and

Available bandwidth=1−Metric

When the back-off counter continues decreasing, the metric is updated. T1 is then the time interval until the device wakes-up to transmit and monitor the medium.

If a second frame 226 is detected during this contention window, the back-off counter is frozen, and the metric is then given by:

Metric=(δ*t*+NAV1+NAV2)/*T*2;

and

Available bandwidth=1−metrics

Again when the back-off counter continues decreasing, the metric is updated: T 228 is then the time interval until the device wakes-up to transmit and listens to the medium.

When the back-off expires, the estimated bandwidth is then given by:

Available bandwidth=1−(δ*t*+NAV1+NAV2)/*T*

Both the above described methods (i.e. any metric and/or idle or busy states) can be used in combination. The combination would provide a more accurate estimation of the WLAN traffic and thus of the available bandwidth than each method individually, but each can be carried out alone to give advantages.

When a new V2IP packet has to be transmitted, the WLAN chip set control software will determine an estimate of available bandwidth for the next V2IP packet transmission from NAV or other metric readings as described above. The data rate selection is computed as follows.

Assuming:
target packet error rate (PER)=10%
transmitter throughput Tx (TP) is the equivalent throughput if the medium was 100% assigned to the user and is given by $$Tx(TP) = \frac{(500 \text{ (Khz)} \times 1.2)}{Z} \qquad \text{Equation 1}$$

where Z is estimated available bandwidth (no unit).
Where 500 Khz is the required throughput for the targeted application, i.e. V2IP
the multiplier 1.2 is used to take into account lost packets (PER=10%), thus transmission must be at least 10% greater and the value here is nominal set to 20% to give some flexibility. From equation 1, the minimum WLAN data rate to meet this throughput can be determined. NAV indicates in this case that Z is 40%.

Thus Tx (TP)=1500 Kbps.

The closest superior data rate to this throughput (from the data rates as defined by 802.11b or 802.11g standards 1 Mbps, 2 Mbps, 5.5 Mbps, 6 Mbps, 11 Mbps . . . . ) for a packet size of 1500 bytes is 2 Mbps. For shorter packets there will be faster data-rates because the weight of overhead due to WLAN increases.

In an alternative embodiment a look up table, may be defined which identifies NAV boundaries for a specific data-rate for 1500 byte packets (size of a V2IP packet). For a 1024 byte (the closest to a V2IP data packet), the following combination of data-rates (only 11 b data-rates) and NAV ranges are shown, although others will be evident to the skilled person:

11 Mbps: available bandwidth<13%
5.5 Mbps: 13%<available bandwidth<35%
2 Mbps: 35%<available bandwidth<66%
1 Mbps: 66%<available bandwidth There are a number of advantages of using NAV as the metric to select the data rate, these include:

- the correlation of NAV and estimated available bandwidth at the time of packet transmission is a practical metric to use and the relationship is known;
- NAV is an embedded metric present in all WLAN chip set and does not need separate determination;
- No additional state machine is needed to estimate the available bandwidth as NAV is used; and
- the chip set can be switched off between two successive transmissions and NAV can be quickly determined again when the chip set is switched on again.

The above advantages are all useful in the effort to minimise power consumption for the WLAN chip set.

As NAV is part of the 802 specification details that are embedded in any chip set. NAV must be read in order to use it and this can be accomplished in any appropriate way. Once the data rates has been identified this is used to reduce power consumption in the WLAN. This is achieved by optimising a number of parameters, including the chip set transmitter power and the power amplifier (PA) Error Vector Magnitude (EVM) control. The PA EVM and PA bias voltage control are linked. Details of PA EVM enable determination of optimised PA bias voltage control as EVM performance depends on its biasing. PA bias voltage is also linked to the NAV or other similar metrics which might be used to estimate the WLAN traffic and determine data-rate according to the present invention. Details of determination of PA bias voltage could thus be based on a look-up-table associated with the selected metric (NAV, CCA, RSSI etc). A low PA bias generally means both a poor EVM and low power consumption.

For low data rates the value of Tx EVM does not need to be high. The IEEE standard does not define that the same EVM value should be used for all the data rates. A WLAN device (chip set and PA) must ideally meet IEEE specification. The resulting method results in the following effects:

- for high data rates the PA is very linear and a high bias is applied.
- for low data rates a less efficient operation is selected and a lower bias is applied so that the PA performance is degraded to the lowest level allowed by the 802.11 standard.

Table 1 below shows an example of a look up table relating data rate and EVM values.

TABLE 1

| Data Rate | Tx IEEE EVM | PA Target EVM (dB) | PA Target EVM (%) |
|---|---|---|---|
| 11 Mbps | 9 | | |
| 6 Mbps OFDM | 5 | 9 | 35.5% |
| 12 Mbps OFDM | 10 | 16 | 15.8% |
| 54 Mbps OFDM | 25 | 29 | 3.5% |

PA EVM must be better than the IEEE specification so that the overall EVM (combining PA & WLAN transmitter) is compliant with the IEEE specification.

In the present invention PA EVM can be controlled by the PA DAC output which is derived from the data rate as previously mentioned. For a typical V2IP application 6M bps is selected as the most common data rate. The reduction in Tx power (Tx (PR)) from a normal level of 54 Mbps is:

$$65\ mA \times 3V = 200\ mW$$

where 3V is the typically PA supply voltage and where 65 mA is the PA current reduction which results of adapting the PA bias voltage to the required EVM for 6 Mbps, as defined by the IEEE specification, compared to the PA current if it was biased with a fixed voltage for 54 Mbps. This equates to about 20% Tx power consumption reduction. A further element to reduce power consumption is to reduce transmission power by improving the power control algorithm.

Before transmitting a new V2IP packet the host software reads NAV (or another metric which gives an estimate of the expected available bandwidth) updates the PER (this can be determined from the latest N received packets) and selects the data rate. The result is that a suggested change to Power of transmission (PTx) can be determined; a number of examples are shown in table 2 bellow. PER target=10% typically.

TABLE 2

| Data Rate | PER | Action |
|---|---|---|
| Unchanged | ≤PER Target | Decrease PT x by δP0 |
| Unchanged | >PER Target | Increase PT x by δP0 |
| Changed | | PTx = OldPTx + ΔP |

Where:

δP0 is the WLAN chipset power step ΔP is the IEEE sensitivity of new data rate minus the IEE sensitivity of the old data rate (units dB).

In an example, if the new NAV results in decreasing data rate from 36 Mbps to 12 Mbps then ΔP=−9 dB is used to accelerate the convergence of the power control algorithm. If it were not used packet transmission would continue and the desired power consumption reduction may not be as effective. This power reduction will decrease by δP0=0.5 dB per V2IP transmission, meaning Tx power control is effective after 18 V2IP data packet transmissions.

In comparing the performance of the present invention with a common link adaptation method it has been found that the power consumption reduction is about 35%. This is a significant difference and provides one of the many advantages of the present invention. Others include the following:

- using network allocation vectors (NAV) (or another metric) as a metric to estimate WLAN traffic or medium occupancy or the available bandwidth;
- selecting a minimum WLAN data rate based on the measured NAV (or another metrics) to meet a targeted V2IP throughput which may be selected to be minimal;
- select power amplifier (PA) bias voltage based on selected data rate so that the error vector magnitude (EVM) of the transmitter is compliant with the required sensitivity and the IEEE EVM specification for the selected data rate;
- programming the WLAN chip set data rate and PA digital to Analogue Converter (DAC) voltage for the selected PA bias voltage and transmission power based on packet error rate (PER) estimations;
- program appropriately transmission power when WLAN selected data-rate is changed, to accelerate the convergence speed of the power control algorithm;
- degrading PA bias back-offs for slow data rates.

Figure 3:
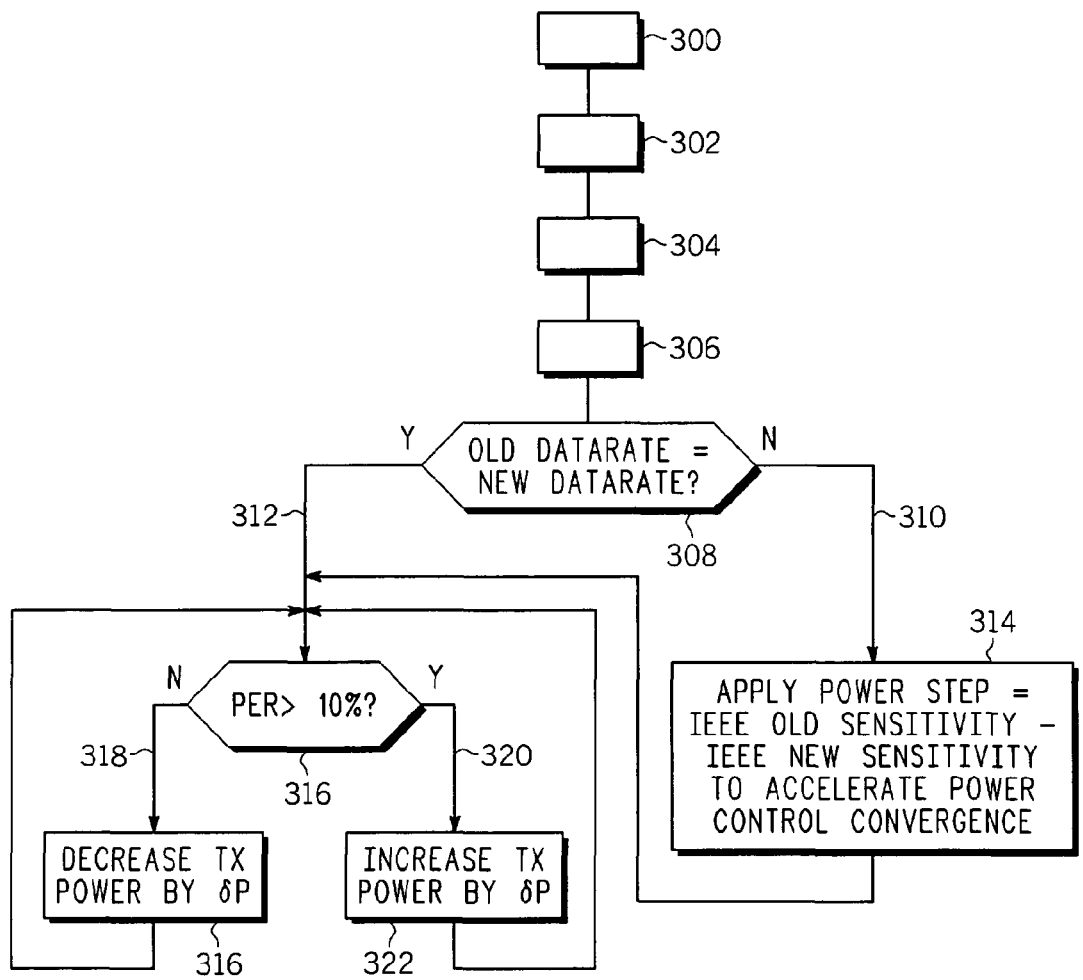
FIG. 3 is a flowchart of the steps of an embodiment of the invention given by way of example.

Referring now to FIG. 3 a flow chart of the invention is shown. To start with the NAV (or other metric is read) and available bandwidth is predicted 300. The required throughput is calculated 302. The WLAN data rate for the required throughput of V2IP packets is selected 304. The PA bias for this data rate is then selected 306. A determination is then made as to whether the new data rate is the same as the most recent old data rate 308. If the answer is no (310) the power step is applied (314). The power step is achieved by subtracting the new IEEE sensitivity from the old to accelerate power control convergence. The process then continues as if the answer have been yes (312) on the determination at step 308. The PER is compared with a target PER (for example 10%) 316. If the PER is greater that the target (Y, 320) the Tx power is increased by δP 322 and if it is less than or equal to the target (N, 318) the Tx power is decreased by δP.

The above system and method brings about substantial reduction in voltage, current and thus power for the PA and of the transmitted RF power and thus for the WLAN device as a whole. This reduces the power consumption as desired.

The invention claimed is:

1. A method of configuring the operation of a wireless local area network (WLAN) device which is used in the transmission and reception of a service over a medium, the WLAN device comprising a WLAN chip set and power amplifier, the method comprising the steps of:
    determining, based on a measurement of network performance, a value of a WLAN traffic indicator metric used in the chip set at a specific time to estimate the WLAN traffic, the WLAN traffic indicator indicating an amount of WLAN traffic;
    predicting an estimation of the available bandwidth of the WLAN from the value of the metric;
    calculating a data rate of the WLAN based on estimated available bandwidth, a target packet error rate, and a required throughput value, wherein calculating the data rate of the WLAN based on the estimated available bandwidth, the required throughput value, and the target packet error rate includes: multiplying the required throughput value by a multiplier to take into account the target packet error rate, and then dividing the result by the estimated available bandwidth; and
    selecting a power amplifier bias voltage at the WLAN device that is the minimum determined from a look up table of power amplifier bias voltage and data rate for the data rate.

2. The method of claim 1, further comprising, calculating a level for the transmission power of the WLAN chip set from the data rate.

3. The method of claim 2, wherein the calculating step comprises:
    selecting a level for the transmission power for the WLAN based a comparison of the data rate with a last known data rate of the device and based on a comparison of a packet error rate (PER) with the target packet error rate.

4. The method of claim 3, further comprising applying a first power reduction step to the transmission power as a result of the comparison of the data rate with the last known data-rate.

5. The method of claim 4, further comprising applying the power reduction step based on the power ratio of the sensitivities of a current and a latest standard defined sensitivity of the WLAN.

6. The method of claim 3, further comprising applying a second power reduction step to the transmission power as a result of the comparison between the PER with the target PER.

7. The method of claim 4, wherein the steps of applying a power reduction are continued until the PER matches the target PER.

8. The method of claim 1, wherein the step of determining the value of a WLAN traffic indicator metric of the chip set at a specific time comprises determining a metric from the set comprising Network Allocation Vector, Received Signal Strength Indicator level and Clear Channel Assessment.

9. A wireless local area network (WLAN) device comprising:
    a WLAN chip set and a power amplifier for transmitting a service over a medium wherein the WLAN chip set includes a medium access controller;
    a modem;
    a receiver; and
    a transmitter, wherein the medium access controller includes a link adaptation model to calculate a data rate from the value of a WLAN traffic indicator metric based on an estimated available bandwidth, a target packet error rate, and a required throughput value, the WLAN traffic indicator indicating an amount of WLAN traffic and wherein the modem uses the current data rate to determine a bias voltage for the power amplifier, which voltage is selected to be the minimum determined from a look up table of power amplifier bias voltage and data rate for the calculated data rate to reduce the power consumption of the power amplifier, wherein calculating the data rate of the WLAN based on the estimated available bandwidth, the required throughput value, and the target packet error rate includes: multiplying the required throughput value by a multiplier to take into account the target packet error a and then dividing h result by the estimated available bandwidth.

10. The WLAN device of claim 9 wherein the modem further generates a transmitter power control signal to minimise the power of the transmitter.

11. The WLAN device of claim 10, wherein the power control signal depends on a comparison of data rate with a last known data rate of the device.

12. The WLAN device of claim 10, wherein the power control signal depends on a comparison of the packet error rate with the target error rate.

13. The WLAN device of claim 9, wherein the value of the WLAN traffic Indicator metric of the chip set is used to predict the available bandwidth in order to determine the data rate.

14. The WLAN device of claim 9, wherein the WLAN traffic Indicator metric of the chip set comprises Network Allocation Vector, Received Signal Strength Indicator level and Clear Channel Assessment.

15. The WLAN device according to claim 9, wherein the service is Voice over IP.

16. The WLAN device of claim 9, wherein the service is Voice and Video over IP.

17. A method of optimising the operation of a WLAN device which is used in the transmission and reception of a service over a medium, the WLAN device comprising a WLAN chip set and power amplifier, the method comprising the steps of:
    determining a value of a WLAN traffic indicator metric used in the chip set at a specific time;
    estimating an available bandwidth of the WLAN from the value of the metric;
    determining the a data rate of the WLAN based on estimated available bandwidth and the type of service;
    selecting a power amplifier bias voltage that is the minimum determined from a look up table of power amplifier bias voltage and data rate for the determined data rate to reduce power consumption of the WLAN device; and generating a power control signal for minimizing the power of a transmitter of the WLAN device depending on a difference between a first and a second sensitivity predefined for the WLAN device for the determined data rate and a last known data rate and, when the determined data rate equals the last known data rate, depending on a size of a power step of the WLAN chip set and a difference of a packet error rate and a target error rate.

18. The method of claim 17, further comprising:

calculating a level for the transmission power of the WLAN chip set from the data rate.

19. The method of claim 18, wherein the calculating step comprises:

selecting a level for the transmission power for the WLAN based a comparison of the data rate with a last known data rate of the device and based on a comparison of a packet error rate with the target packet error rate.

20. The method of claim 19, further comprising:

applying a first power reduction step to the transmission power as a result of the comparison of the data rate with the last known data-rate.

\* \* \* \* \*